W. R. STUTEVILLE.
AUTOMATICALLY CONTROLLED PUMP.
APPLICATION FILED OCT. 29, 1914.
1,135,221.
Patented Apr. 13, 1915.
2 SHEETS—SHEET 2.
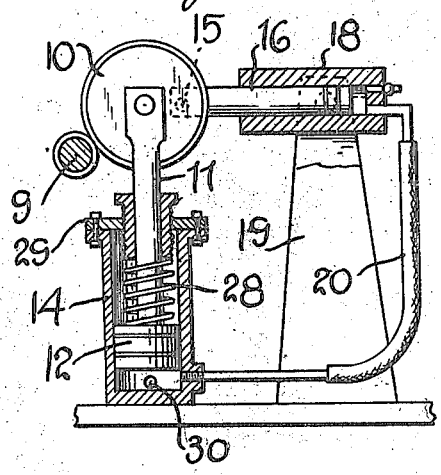
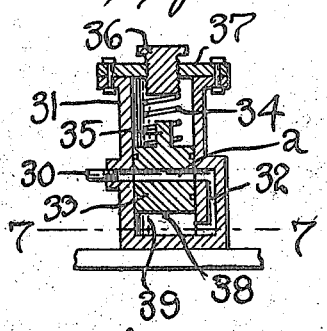
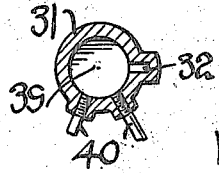
Inventor
W. R. STUTEVILLE
Witnesses

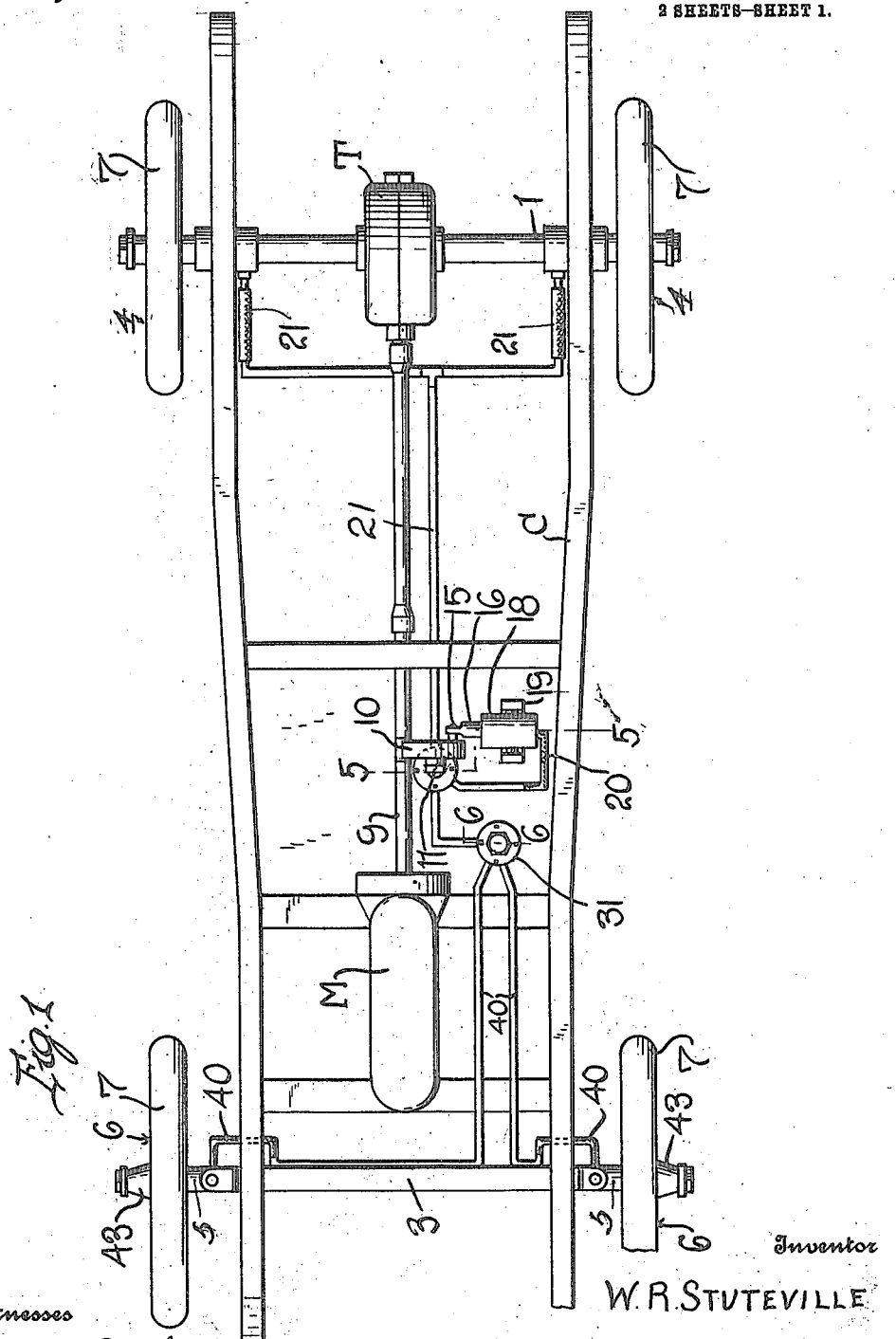

UNITED STATES PATENT OFFICE.

WILLIAM R. STUTEVILLE, OF VESTA, NEBRASKA.

AUTOMATICALLY-CONTROLLED PUMP.

1,135,221.  Specification of Letters Patent.  Patented Apr. 13, 1915.

Application filed October 29, 1914. Serial No. 869,303.

*To all whom it may concern:*

Be it known that I, WILLIAM R. STUTEVILLE, a citizen of the United States, residing at Vesta, in the county of Johnson and State of Nebraska, have invented certain new and useful Improvements in Automatically-Controlled Pumps, of which the following is a specification, reference being had to the accompanying drawings.

This invention relates to certain improvements in automatically controlled pumps and has relation more particularly to an apparatus of this general character especially designed and adapted for use in compressing fluids; and an object of the invention is to provide an automatically controlled pump including novel and improved means whereby a predetermined pressure may be maintained in the tires of a vehicle.

It is also an object of the invention to provide an automatically controlled pump having novel and improved means whereby the same may be operated from the motor of a vehicle and whereby the operative engagement with the motor is under control of the pressure within the tires.

The invention consists in the details of construction and in the combination and arrangement of the several parts of my improved automatically controlled pump whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in top plan of the chassis or body of a motor vehicle, illustrating an apparatus constructed in accordance with an embodiment of my invention; Fig. 2 is a sectional view taken substantially on the line 5—5 of Fig. 1; Fig. 3 is a sectional view taken substantially on the line 6—6 of Fig. 1; Fig. 4 is a sectional view taken substantially on the line 7—7 of Fig. 3.

As disclosed in the accompanying drawings, C denotes a conventional body or chassis of a motor vehicle operatively engaged with the casing 1 surrounding the rear axle 2 and the front axle 3. The rear axle 2 has mounted thereon the wheels 4 while coacting, in a conventional way, with the front or forward axle 3 are the spindles 5 on which are rotatably mounted the wheels 6, each of the wheels 4 and 6 being provided with an inflatable tire 7 of conventional form and each serving as a receiving member.

Suitably supported by the chassis C is a motor M of any desired type including the driven friction member 9 with which is adapted to coact the friction disk 10 rotatably supported by the projected extremity of a rod 11 operatively engaged with a piston 12 mounted for reciprocation within a cylinder 14 carried by the chassis C. The disk 10 is provided with a wrist pin 15 with which is operatively engaged the compression rod 16 coacting with a conventional cylinder 18, said cylinder being herein disclosed as pivotally supported by the bearing 19 carried by the chassis C, whereby rotation of the disk 10, when in engagement with the driven friction member 9, will result in the requisite reciprocations of the rod 16 to create the requisite compression of air. The cylinder 18 has in communication therewith the flexible conduit 20 leading to the cylinder 14 below, as herein embodied, the piston 12.

The cylinder 14 has also in communication therewith below the piston 12 a conduit 21 extending rearwardly of the body or chassis C. It is to be observed that the conduit 21 at its rear extremity is branched in order to straddle the conventional transmission T, so as to afford communication, in any desired manner, with the tires or receiving members 7 carried by the wheels 4.

As has been set forth, it will be readily perceived that the tire 7 on the rear wheels 4 will be readily and conveniently inflated upon rotation of the disk 10. When the pressure within the tires 7 of the rear wheels 4 reaches a predetermined degree, the excess pressure will impart an upward movement to the piston 12 which will cause a disengagement between the disk 10 and the frictional element 9 and under the influence of the expansible member 28 encircling the rod 11 and interposed between the piston 12 and the head 29 of the cylinder 14, the disk 10 will be returned into contact with the frictional element 9 upon the pressure within the tires dropping below the predetermined degree, as is believed to be clearly obvious to those skilled in the art to which my invention appertains.

Also leading from the cylinder 18 at a point below the piston 17 thereof is a conduit 30 in communication with the casing 31 at a point intermediate the length thereof. The casing 31 at a point diametrically opposed to the point of communication therewith of the conduit 30 has in communication therewith a second conduit 32 which also communicates with the casing 31 at the base thereof. Mounted within the casing 31 is a valve member 33 having a port $a$ normally maintained in register with the points of communication between the casing and the conduits 30 and 32 through the medium of the expansible member 34, herein disclosed as encircling an extension 35 of the valve and interposed between the valve member and the endwise adjustable member 36 threaded through the head 37 of the casing. The tension of the expansible member 34 may be regulated upon adjustment of the endwise movable member, for a purpose which will hereinafter be self-evident. The lower portion of the casing 31 is intersected by the stop pin 38 whereby the downward movement of the valve member 33 is limited to assure an air chamber 39 below such valve at all times.

In communication with the air chamber 39 are the conduits 40, each of said conduits being in suitable communication with the tires or receiving members 7 carried by the front wheels 6.

It will be observed that upon an excess pressure within the tires on the forward wheels 6, the valve member 33 will be elevated and caused to close the communication between the cylinder 18 and the air chamber 39. It is also thought to be obvious that upon decrease of pressure within the tires below a predetermined point, the expansible member 34 automatically moves the valve member 33 downward and permits air to be forced within the tires.

While it is believed to be self-evident, it might be well to state that the adjustment of the endwise movable member 36 serves to control the pressure at which the valve member 33 will be elevated and also determines the degree of pressure at which the disk 10 will be adjusted out of engagement with the frictional member 9 of the motor M.

From the foregoing description, it is thought to be obvious that an automatically controlled pump constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination with a receiving member, a driven friction member, a cylinder, a piston within the cylinder and provided with a rod projecting exteriorly of the cylinder, a friction disk carried by the rod and adapted to engage the friction member, an air compressor, an operative connection between the disk and compressor, a conduit leading from the air compressor to the cylinder and in communication with the cylinder at a point below the piston, and a conduit leading from the cylinder to the receiving member.

2. In combination with a receiving member, a driven friction member, a cylinder, a piston within the cylinder and provided with a rod projecting exteriorly of the cylinder, a friction disk carried by the rod and adapted to engage the friction member, an air compressor, an operative connection between the disk and compressor, a conduit leading from the air compressor to the cylinder and in communication with the cylinder at a point below the piston, a conduit leading from the cylinder to the receiving member, and a normally open valve interposed in the last named conduit, the excess pressure within the receiving member serving to adjust the valve into a closed position.

3. In combination with a receiving member, a driven friction member, a cylinder, a piston within the cylinder and provided with a rod projecting exteriorly of the cylinder, a friction disk carried by the rod and adapted to engage the friction member, an air compressor, an operative connection between the disk and compressor, a conduit leading from the air compressor to the cylinder and in communication with the cylinder at a point below the piston, a conduit leading from the cylinder to the receiving member, and means for normally maintaining the friction disk in engagement with the friction member.

4. In combination with a plurality of receiving members, an air compressor, conduits leading from the compressor to the several receiving members, and means for controlling the flow through certain of the conduits independent of the remainder whereby said first named conduits may be automatically closed without interfering with the operation of the compressor.

In testimony whereof I hereunto affix my signature in the presence of two witnesses.

WILLIAM R. STUTEVILLE.

Witnesses:
F. C. RULLA,
ARTHUR BENTZINGER.